US008155282B2

(12) United States Patent
Thaper et al.

(10) Patent No.: US 8,155,282 B2
(45) Date of Patent: Apr. 10, 2012

(54) SELF-PROVISIONING, NOTIFICATION, RETRIEVAL, AND SUBMISSION OF VISUAL VOICE MAIL

(75) Inventors: Atul Thaper, Flemington, NJ (US); Joseph E. Berger, Jr., Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 765 days.

(21) Appl. No.: 12/265,953

(22) Filed: Nov. 6, 2008

(65) Prior Publication Data

US 2009/0154663 A1   Jun. 18, 2009

Related U.S. Application Data

(60) Provisional application No. 61/013,549, filed on Dec. 13, 2007, provisional application No. 61/018,044, filed on Dec. 31, 2007.

(51) Int. Cl.
*H04M 11/00* (2006.01)

(52) U.S. Cl. .................. 379/88.18; 370/352; 379/88.17; 379/88.19; 379/88.22; 455/413; 455/414.1; 709/201; 709/229

(58) Field of Classification Search .......... 370/351–356; 379/67.1–88.28; 455/412.1–417; 709/201–207, 709/217–244
See application file for complete search history.

(56) References Cited

U.S. PATENT DOCUMENTS

| | | | | |
|---|---|---|---|---|
| 5,570,414 A * | 10/1996 | Stern | ........................... | 379/88.25 |
| 6,115,455 A * | 9/2000 | Picard | ........................... | 379/67.1 |
| 6,233,318 B1 * | 5/2001 | Picard et al. | ................ | 379/88.17 |
| 6,553,220 B1 * | 4/2003 | Marks | ........................... | 455/413 |
| 6,947,528 B1 * | 9/2005 | Ko et al. | .................... | 379/88.17 |
| 7,191,179 B2 * | 3/2007 | Shaw | .................... | 1/1 |
| 7,209,551 B1 * | 4/2007 | Schroeder et al. | ......... | 379/88.13 |
| 7,283,808 B2 * | 10/2007 | Castell et al. | ................ | 455/413 |
| 2002/0154745 A1 * | 10/2002 | Shtivelman | ................ | 379/88.12 |
| 2004/0136510 A1 * | 7/2004 | Vander Veen | .............. | 379/88.22 |
| 2004/0146145 A1 * | 7/2004 | Kiser et al. | ................. | 379/88.16 |
| 2004/0202291 A1 * | 10/2004 | Skinner | ........................ | 379/67.1 |

OTHER PUBLICATIONS

Co-pending application entitled "Visual Voicemail Provisioning and Notification," filed Nov. 6, 2008; Jack Jianxiu Hao et al.; 62 pages.

* cited by examiner

*Primary Examiner* — Hemant Patel

(57) ABSTRACT

A method includes receiving from a visual voice mail (VVM) client a request to access VVM services and determining whether VVM services have been previously activated. The method further includes providing a negative response to the VVM client if it is determined that VVM services have not been activated and receiving, from the VVM client, a self-provisioning request to initialize VVM services. The method may also include configuring VVM services based on the self-provisioning request and providing, to the VVM client, an indication that VVM services have been configured. The method may additionally include providing notifications and retrieval of voice mail messages, and submitting voice mail messages from the user device.

20 Claims, 11 Drawing Sheets

//+ # SELF-PROVISIONING, NOTIFICATION, RETRIEVAL, AND SUBMISSION OF VISUAL VOICE MAIL

RELATED APPLICATION

This application claims priority to U.S. Provisional Patent Application No. 61/013,549, filed Dec. 13, 2007, and U.S. Provisional Patent Application No. 61/018,044, filed Dec. 31, 2007, the disclosures of which are incorporated by reference herein in their entireties.

BACKGROUND

As with some network-based services, subscribers often have to communicate with a customer services department for activating a new service. For example, a subscriber wishing to utilize a network-based voice mail system would have to contact a customer service representative to select a level of voice mail service, configure various settings, etc.

In a typical voice mail system, a subscriber may call another subscriber. In the event that the called subscriber's handset is turned off or the subscriber does not answer the call, the calling subscriber may leave a voice mail message. Thereafter, the called subscriber may receive an indication that a voice mail message has been received.

DETAILED DESCRIPTION OF PREFERRED EMBODIMENTS

Figure 1:
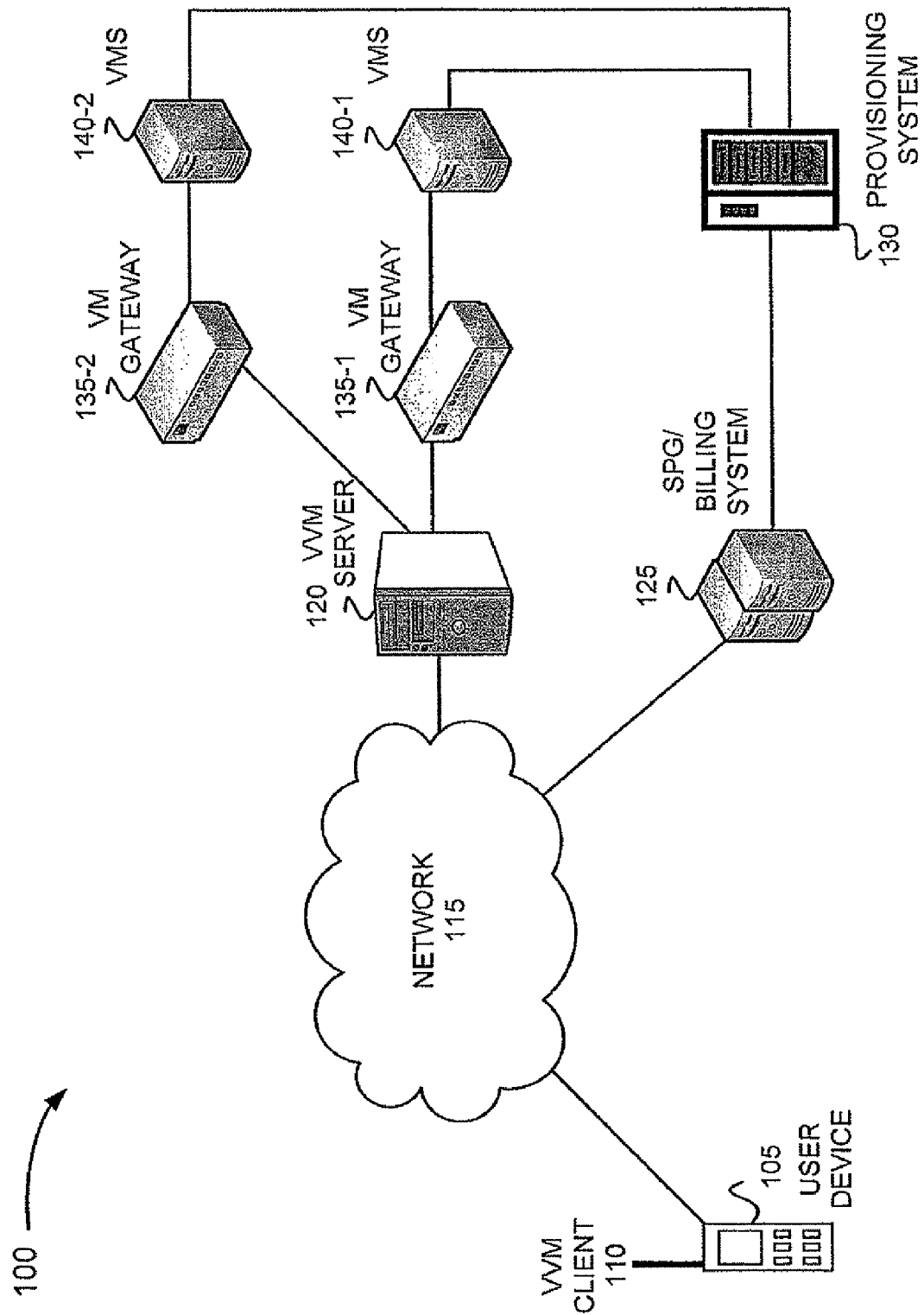
FIG. 1 is a diagram illustrating an exemplary environment in which concepts associated with the self-provisioning of visual voice mail (VVM) services, and the notification, retrieval and submission of voice mail (VM) may be implemented.

The following detailed description refers to the accompanying drawings. The same reference numbers in different drawings may identify the same or similar elements. Also, the following description does not limit the invention.

The concepts described herein relate to the self-provisioning of visual voice mail (VVM) services, and the notification, retrieval and submission of VM. VVM services include adding a visual aspect to voice mail services. For example, VVM may allow subscribers to listen to, delete, etc., their messages in order of their choice. VVM may allow subscribers to see a list of all of their voice mail messages, along with other information (e.g., date, time of receipt, message duration). Subscribers may select various options with respect to voicemail, such as, for example, call back, reply, forward, add to contacts, as well as other voice message management functions. With respect to self-provisioning, a subscriber may initialize VVM services based on a self-provisioning system. For example, the subscriber may download a VVM client to a user device. The VVM client may connect to a self-provisioning system that allows the subscriber to select a service plan, agree to terms and conditions, configure subscriber settings, etc. Based on this interaction, the self-provisioning system may configure a VVM system. A VVM system, as used herein, may include, for example, one or multiple network devices that provide VVM services. Thereafter, the subscriber may utilize VVM services.

Additionally, the concepts described herein relate to the notification and retrieval of a new voice mail message. For example, the VVM system may notify the VVM client via a VVM server. The VVM server may retrieve the headers of the voice messages and mail box quota information. The VVM server may return the voice message headers to the VVM client. The VVM client may request the new voice mail message from the VVM server, and the VVM server may retrieve the new voice mail message from the VMS.

Further, the concepts described herein relate to submission of VVM. For example, the VVM client may permit a subscriber to record an audio message and deposit the audio message to another party's voice mail (VM)/VVM box via the VVM server. That is, unlike other voice mail (VM) systems, the subscriber need not call the other party.

As a result of the foregoing, subscribers may self-provision VVM services without interaction with customer support. Additionally, or alternatively, subscribers may receive notifications, and retrieve and submit VVM messages in a manner unlike other VM systems. Since concepts have been broadly described, variations to the above concepts will be discussed further below.

Although particular protocols, such as, for example, eXtensible Markup Language (XML), Hypertext Transfer Protocol (HTTP), Short Message Peer-to-Peer (SMPP) protocol, Internet Message Access Protocol Ver. 4 (IMAP4), Simple Mail Transfer Protocol (SMTP), etc., may be discussed in reference to implementations associated with the concepts described herein, other protocols not specifically described herein may be employed. Accordingly, the concepts described herein are not dependent on employing particular protocols, but may be adapted to other protocol schemes. Additionally, although particular network devices may be discussed in reference to implementations associated with the concepts described herein, other network devices not specifically described herein may be employed. Thus, although network devices, such as, for example gateways, servers, etc., may be described, in other implementations, other types of devices may be employed.

FIG. 1 is a diagram of an exemplary environment in which concepts associated with the self-provisioning of VVM services, and the notification, retrieval and submission of VM may be implemented. As illustrated, environment 100 may include a user device 105 having a VVM client 110, a network 115, a VVM server 120, a self-provisioning gateway (SPG)/Billing system 125, a provisioning system 130, voice messaging gateways (VMGs) 135-1 and 135-2, and voice mail systems (VMSs) 140-1 and 140-2.

User device 105 may include a device, for example, having communication capabilities. For example, user device 105 may include a computer, a portable device, a handheld device, a mobile device, a stationary device, a wireless telephone, a personal digital assistant (PDA), a web-browsing device, a vehicle-based communication system, and/or some other type of communication device. User device 105 may permit a subscriber to place and receive telephone calls. As will be described in greater detail below, user device 105 may include a voice mail client, such as VVM client 110.

Network 115 may include, for example, the Internet, an Intranet, a local area network (LAN), a wide area network (WAN), a telephone network (e.g., a Public Switched Telephone Network (PSTN), a wireless network, a cellular network, and/or a combination of networks.

VVM server 120 may include a device that acts as an intermediary between VVM client 110 and VMSs 140-1 and 140-2. VVM server 120 may perform various operations associated with the utilization of VVM services by VVM client 110.

SPG/Billing system 125 may include a device that provides access to provisioning system 130. SPG/Billing system 125 may manage subscriber accounts and facilitate self-provisioning of VVM services.

Provisioning system 130 may include a device that during an initialization of VVM services, configures VMSs 140-1 or 140-2. That is, provisioning system 130 may provision the appropriate class of service on VMSs 140-1 or 140-2.

VMGs 135-1 and 135-2 each may include a device that provides access to VMSs 140-1 and 140-2. VMGs 135-1 and 135-2 may each perform other types of communicative operations (e.g., transcoding, etc.). For example, VMGs 135-1 and 135-2 may perform audio transcoding from VMS vendors' proprietary format to an industry standard format (e.g., Qualcomm Code Excited Linear Prediction (QCELP)).

VMSs 140-1 and 140-2 each may include a device that provides VVM services. VMSs 140-1 and 140-2 may each include multiple voice mail systems. In one implementation, these voice mail systems may be different (e.g., different software and/or hardware voice mail systems). In other implementations, these voice mail systems may be the same.

Although FIG. 1 illustrates an exemplary environment 100, in other implementations, environment 100 may include additional, fewer, or different devices. For example, environment 100 may be implemented without VM gateways. Additionally, or alternatively, environment 100 may include VM systems that do not provide VVM services. It will be appreciated that the connections between the devices and/or the network are exemplary. Additionally, or alternatively, it will be appreciated that one or more functions described as being performed by a device may be performed by another device(s) or in combination therewith.

Figure 2:
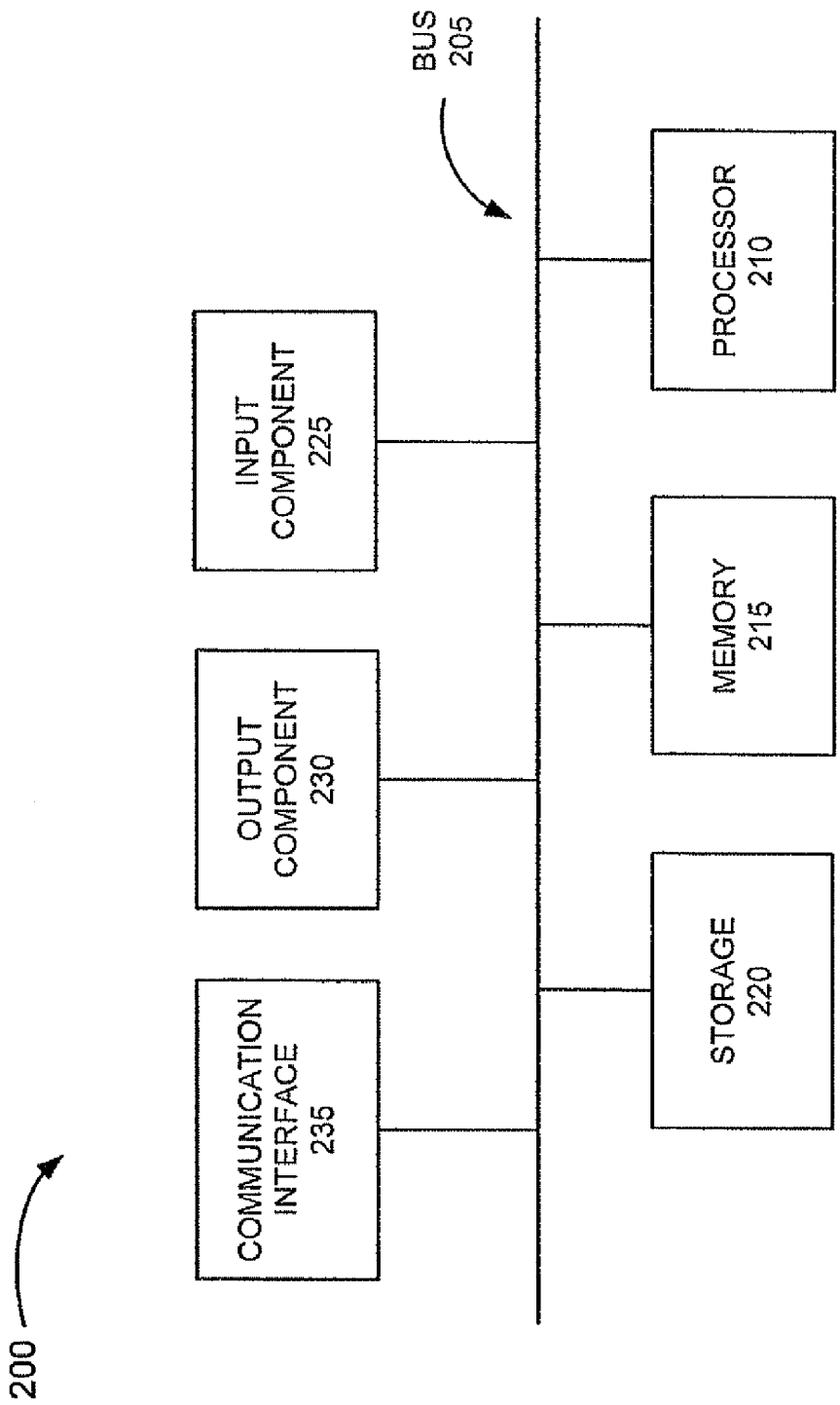
FIG. 2 is a diagram illustrating exemplary components of a device that may correspond to one or more of the exemplary devices depicted in FIG. 1.

FIG. 2 is a diagram illustrating exemplary components of a device that may correspond to one or more of the exemplary devices in environment 100. As illustrated, device 200 may include a bus 205, a processor 210, a memory 215, storage 220, an input component 225, an output component 230, and a communication interface 235.

Bus 205 may include a path that permits communication among the components of device 105. For example, bus 205 may include a system bus, an address bus, a data bus, and/or a control bus. Bus 205 may also include bus drivers, bus arbiters, bus interfaces, and/or clocks.

Processor 210 may include a component that interprets and/or executes instructions and/or data. For example, processor 210 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions and/or data.

Memory 215 may include a component that stores data, an application, and/or instructions related to the operation and use of user device 105. For example, memory 215 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 220 may include a component that stores data, an application (e.g., VVM client 110, VVM applications, etc.) and/or instructions related to the operation and use of device 200. For example, storage 220 may include a hard disk (e.g., a magnetic disk, an optical disk, a magneto-optic disk, etc.) or another type of computer-readable medium, along with a corresponding drive. The term "computer-readable medium" is intended to be broadly interpreted to include a physical or a logical memory device. Memory 215 and/or storage 220 may also include a storing device external to and/or removable from user device 105, such as a Universal Serial Bus (USB) memory stick, a hard disk, etc.

Input component 225 may include a component that permits a user and/or another component to input information to user device 105. For example, input component 225 may include as a keyboard, a keypad, a touch screen, a touchpad, a mouse, a button, a switch, a microphone, an input port, voice recognition logic, and/or some other type of visual and/or auditory input component. Output component 230 may include a component that outputs information to a user and/or another component. For example, output component 230 may include a display, a speaker, one or more light emitting diodes (LEDs), an output port, a vibrator, and/or some other type of visual, auditory, and/or tactile output component.

Communication interface 235 may include a component that enables user device 105 to communicate with other components and/or systems. For example, communication interface 235 may include an Ethernet interface, an optical interface, a coaxial interface, a radio interface, or the like that permit device 200 to communicate with network 115 and other devices in environment 100.

Although FIG. 2 illustrates exemplary components, in other implementations, device 200 may include additional, fewer, or different components.

Figure 3:
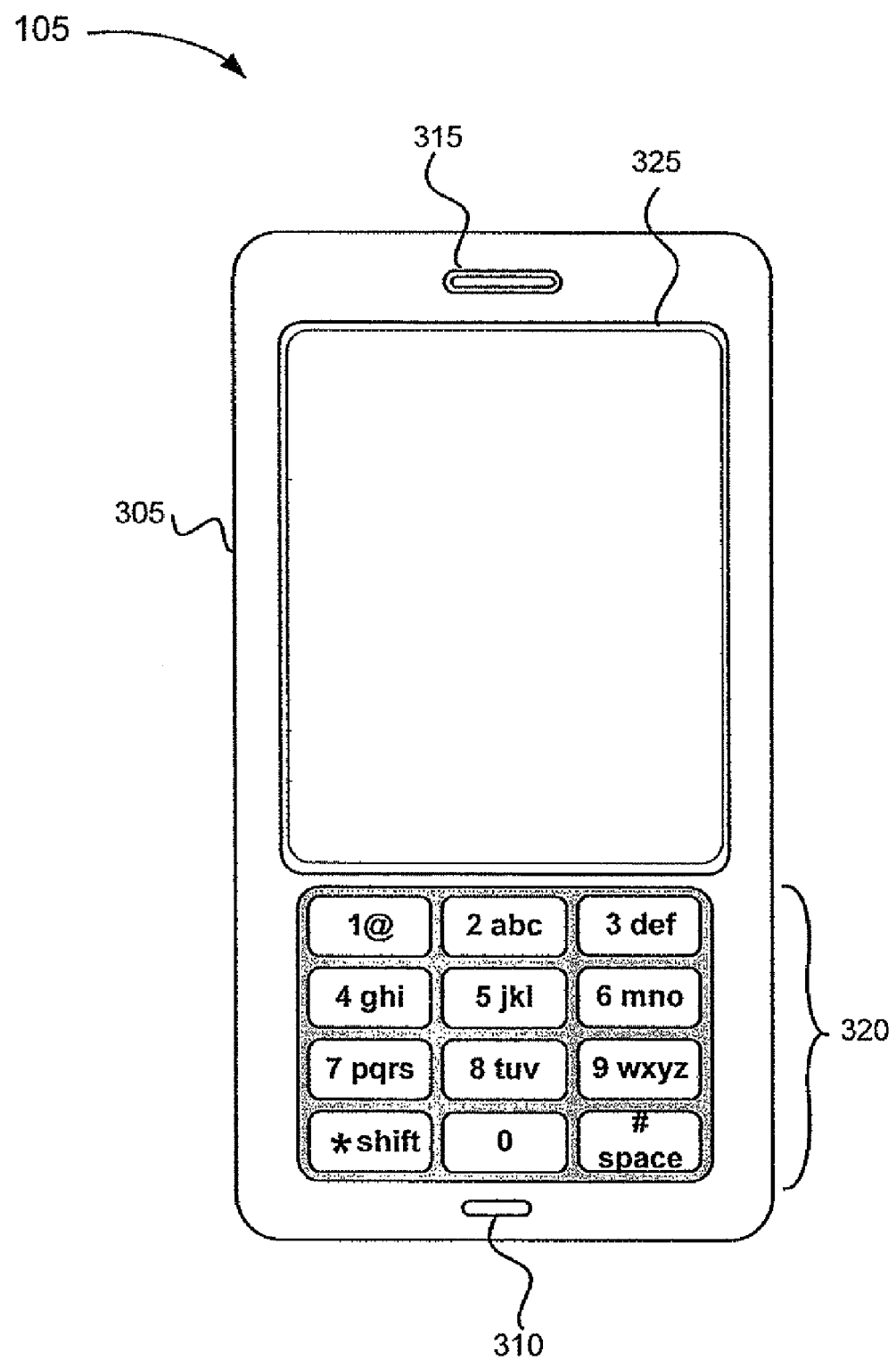
FIG. 3 is a diagram illustrating exemplary components of the exemplary user device depicted in FIG. 1.

FIG. 3 is a diagram illustrating exemplary external components of user device 105. As illustrated, user device 105 may include a housing 305, a microphone 310, a speaker 315, a keypad 320, and a display 325.

Housing 305 may include a structure to contain components of device 105. For example, housing 305 may be formed from plastic or metal and may support microphone 310, speaker 315, keypad 320, and display 325.

Microphone 310 may include a component capable of transducing a sound wave to a corresponding electrical signal. For example, a user may speak into microphone 310 during a telephone call. Speaker 315 may include a component capable of transducing an electrical signal to a corresponding sound wave. For example, a user may listen to music or listen to a calling party through speaker 315.

Keypad 320 may include a component capable of providing input to device 105. Keypad 320 may include a standard telephone keypad. Keypad 320 may also include one or more special purpose keys. In one implementation, each key of keypad 320 may be, for example, a pushbutton. A user may utilize keypad 320 for entering information, such as text or a phone number, or activating a special function.

Display 325 may include a component capable of providing visual information. For example, display 325 may include a liquid crystal display (LCD), a plasma display panel (PDP), a field emission display (FED), a thin film transistor (TFT) display, or some other type of display technology. Display 325 may display, for example, text, images, and/or video information to a user. Display 325 may include a touch screen.

Although FIG. 3 illustrates exemplary components, in other implementations, user device 105 may include additional, fewer, or different components.

Described below is an exemplary process for self-provisioning VVM services. The process will be described as being performed by devices in environment 100. It will be appreciated that in one or more operations of process 400, VVM client 110 may provide a user interface to a subscriber to receive user input.

Figure 4A:
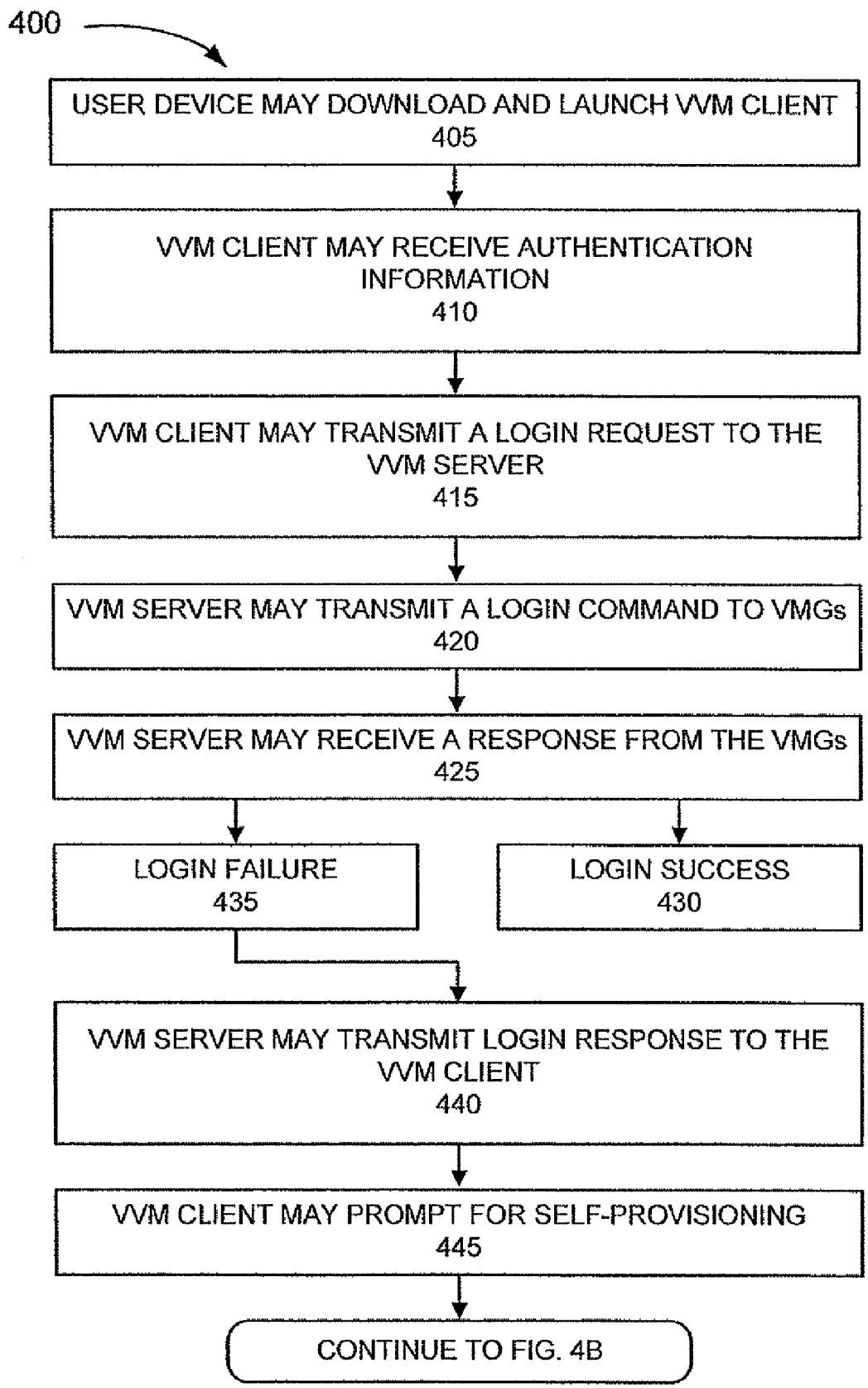
FIGS. 4A and 4B are flow diagrams that illustrates an exemplary process for self-provisioning of visual voice mail (VVM) services.
Figure 4B:
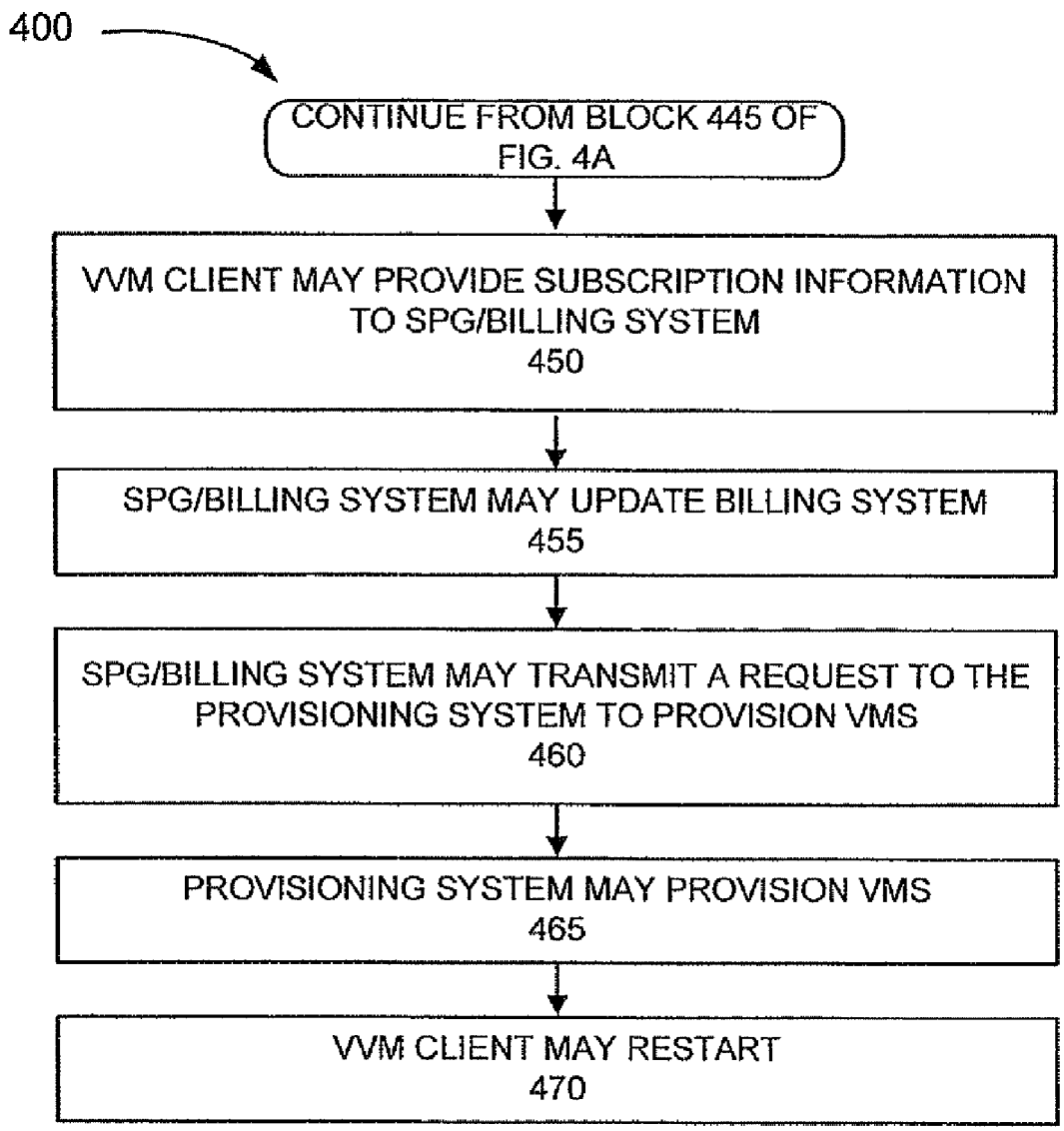
Figure 4C:
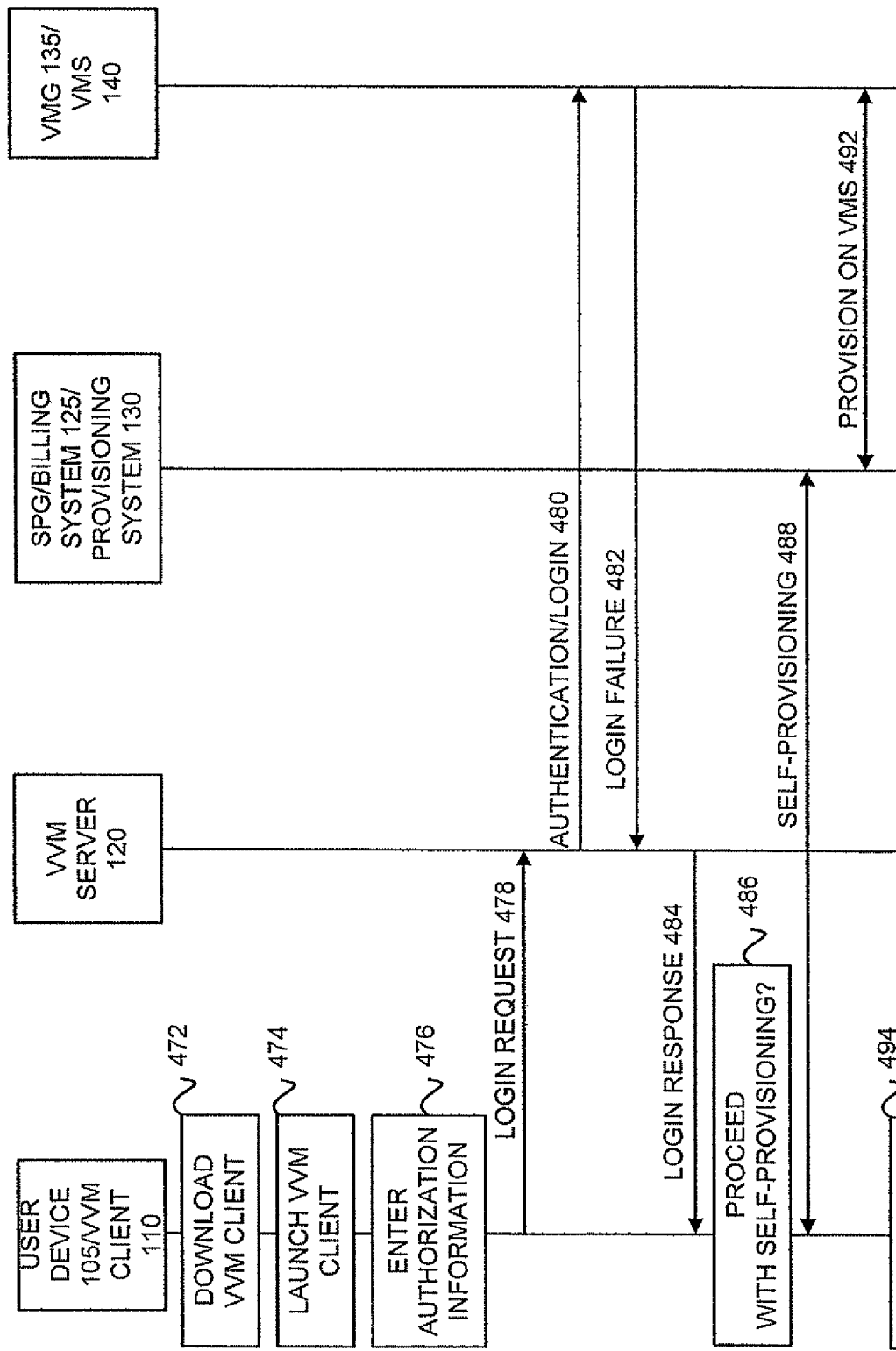
FIG. 4C is a diagram illustrating exemplary messages associated with the self-provisioning process of FIGS. 4A and 4B.

FIGS. 4A and 4B are flow diagrams illustrating an exemplary process 400 for self-provisioning of VVM services. In addition to FIGS. 4A and 4B, process 400 may be described in reference to the previously described figures. FIG. 4C is a diagram illustrating exemplary messages associated with the self-provisioning of FIGS. 4A and 4B.

Process 400 may begin with downloading and launching the VVM client at user device 105 (block 405). In some instances, a subscriber may not have VVM client 110 on user device 105. For example, the subscriber may wish to begin VVM services or the subscriber may have changed user devices (e.g., upgraded) and already has VVM services. User device 105 may connect to a device in environment 100 (e.g., an on-line store, not illustrated in FIG. 1) to download VVM client 110 and launch VVM client 110. For example, as illustrated in FIG. 4C, user device 105 may download VVM client 472 and launch VVM client 474.

VVM client may receive authentication information (block 410). VVM client 110 may prompt the subscriber to enter authentication information. This may occur the first time VVM client 110 is launched. VVM client 110 may request a password, such as a character string (e.g., a numeric string). The subscriber may enter the authentication information by using keypad 320. For example, as illustrated in FIG. 4C, the subscriber may enter authorization information 476 at user device 105.

VVM client may transmit a login request to the VVM server (block 415). VVM client 110 may transmit a login request 478 to VVM server 120, as illustrated in FIG. 4c. The login request may include the authentication information. The login request may also include a mobile directory number (MDN). The MDN may correspond to the MDN of user device 105.

The VVM server may transmit a login command to the VMGs (block 420). VVM server 120 may transmit a login command to VMGs 135-1 and 135-2 to determine which of the VMGs provide access to the appropriate VMS that hosts the voice mail box of the subscriber. In one implementation, VVM server 120 may transmit an IMAP4 AUTHENTICATION/LOGIN command 480, as illustrated in FIG. 4C. In other implementations, other types of protocols may be used, and in turn, other types of login messages may be employed. VMS 140 may validate the authentication information provided by VVM client 110. For example, VMS 140 may determine whether the device is authorized for VVM (e.g., has the voice mail class of service for VVM) based on the authentication information.

The VVM server may receive a response from the VMGs (block 425). VMGs 135-1 and 135-2 may transmit a response to the login command. Depending on whether the subscriber has already activated VVM service (e.g., via customer service), the response may be positive or negative. For example, VMSs 140-1 and 140-2, respectively, may receive an indication from their respective gateways (i.e., VMGs 135-1 and 135-2), and VMSs 140-1 and 140-2 may issue a response to VVM server 120 via VMGs 135-1 and 135-2. On the one hand, when VVM services were previously activated and/or configured on VMSs 140-1 or 140-2, then the response may include a login success response (block 430) (i.e., a positive response). VVM server 120 may transmit the login success message to VVM client 110 (not illustrated in FIG. 4A). In this instance, the subscriber may utilize VVM services once VVM client 110 provides location information to VVM server 120, as will be described in greater detail below in process 500 (e.g., blocks 535, 540, and 545).

On the other hand, when VVM services were not previously activated and/or configured on VMSs 140-1 or 140-2, then the response may include a login failure (block 435) (i.e., a negative response). For example, the response may include an invalid permission response or service not provisioned response (e.g., an authorization failure). That is, VMSs 140-1 and 140-2 may determine a feature subscription and/or authorization status based on the voice mail class of service for VVM provisioned on VMS 140. In this instance, when the voice mail class of service for VVM is not provisioned, VMSs 140-1 and 140-2 may issue a login failure 482, as illustrated in FIG. 4C.

The VVM server may transmit the login response to the VVM client (block 440). VVM server 120 may transmit a login response 484 (e.g., invalid class of service error) to VVM client 110. The login failure may include an address (e.g., a Uniform Resource Locator (URL)) of SPG/Billing system 125.

The VVM client may prompt for self-provisioning (block 445). In the instance when there is a login failure, VVM client 110 may prompt the subscriber to seek permission to self-provision 486 VVM services, as illustrated in FIG. 4C. Assuming that the subscriber proceeds with self-provisioning, process 400 may continue to block 450.

The VVM client may provide subscription information to the SPG/Billing system (block 450). VVM client 110 and SPG/Billing system 125 may interact to provide subscription choices, acceptance of terms and conditions, etc. to self-provision 488 VVM services, as illustrated in FIG. 4C. SPG/Billing system 125 may also verify that the subscriber's account does not have any other restrictions that may impact VVM features and/or services. In one implementation, VVM client and SPG/Billing system 125 may communicate based on Hypertext Markup Language (HTML) and/or Extensible HTML (XHTML). In other implementations, another protocol may be employed. SPG/Billing system 125 may also verify that user device 105 is not restricted from receiving notifications, etc., from VVM server 120. For example, in one implementation, SPG/Billing system 125 may verify that user device 105 has the appropriate version of the phone software and is not blocked from receiving Short Message Service (SMS) messages.

The Billing system may be updated by the SPG/Billing system (block 455). SPG/Billing system 125 may update the subscriber's account to include VVM services.

The SGG/Billing system may transmit a request to the Provisioning system to provision the VMS (block 460). SPG/Billing system 125 may transmit a request to provisioning system 130 to provision VMS 140-1 or VMS 140-2 with the appropriate class of service for VVM services. SPG/Billing system 125 may provide provisioning system 130 with information obtained from VVM client 110 and/or subscriber selections.

The provisioning system may provision the VMS (block 465). Provisioning system 130 may configure VMS 140-1 or VMS 140-2 based on subscription information (as illustrated in FIG. 4C, provision on VMS 492).

The VVM client may be restarted (block 470). After provisioning of VMS 140-1 or VMS 140-2 is completed, VVM client 110 may prompt the subscriber to restart VVM client 110, as illustrated by restart VVM client 494 in FIG. 4C. For example, VVM client 110 may receive an indication that VVM services have been configured (e.g., by VVM server 120). Thereafter, the subscriber may utilize VVM services.

Although FIGS. 4A and 4B illustrate an exemplary process 400, in other implementations, fewer, additional, or different operations may be performed.

Figure 5A:
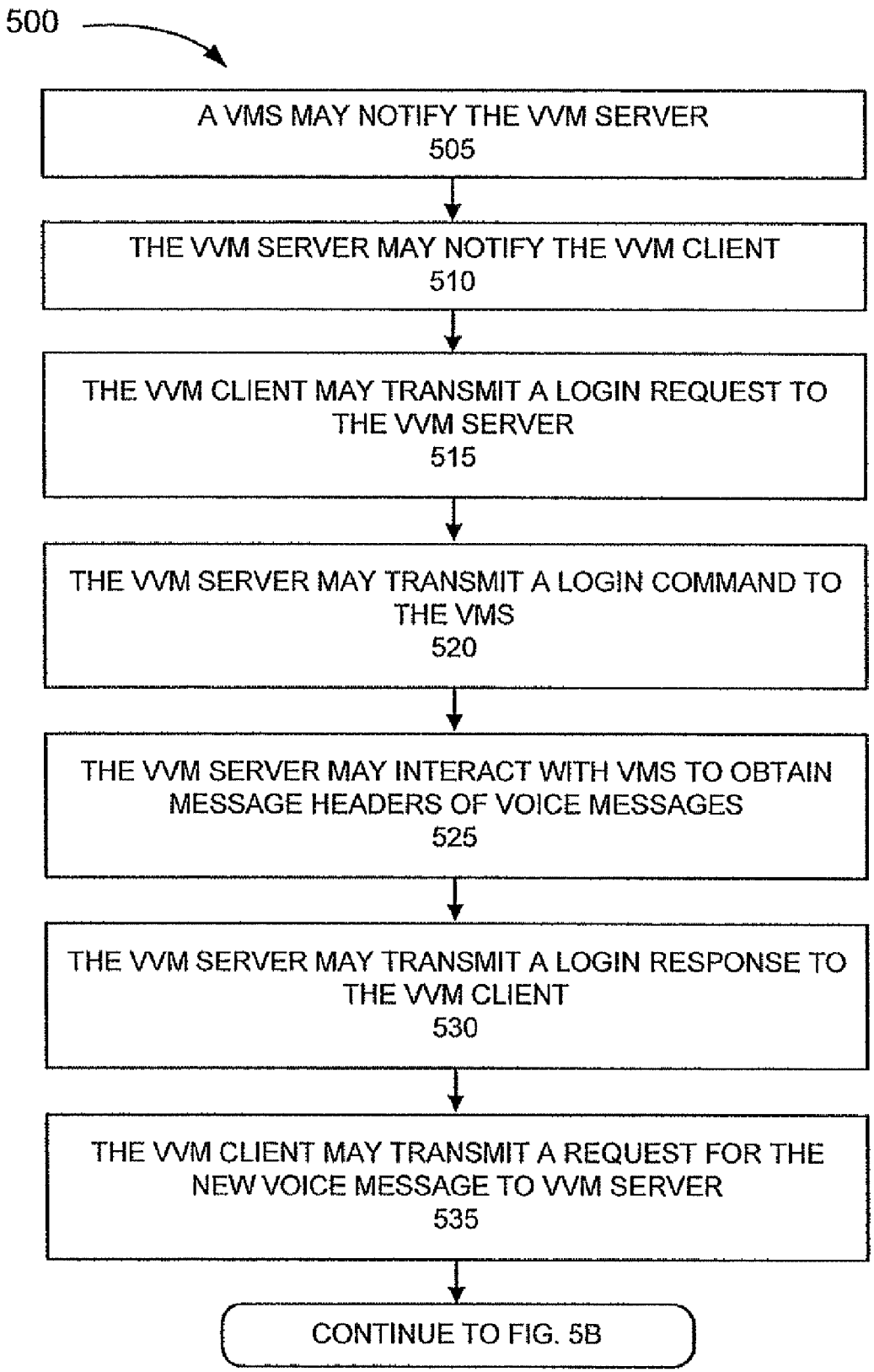
FIGS. 5A and 5B are flow diagrams illustrating an exemplary process for providing notification and retrieval of a new voice message.
Figure 5B:
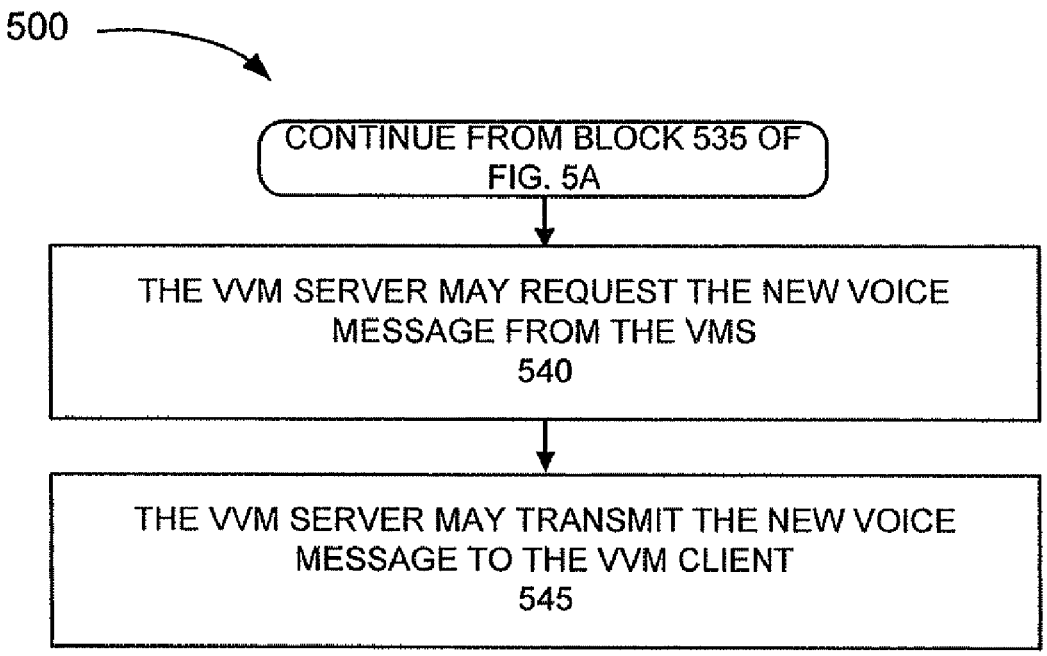
Figure 5C:
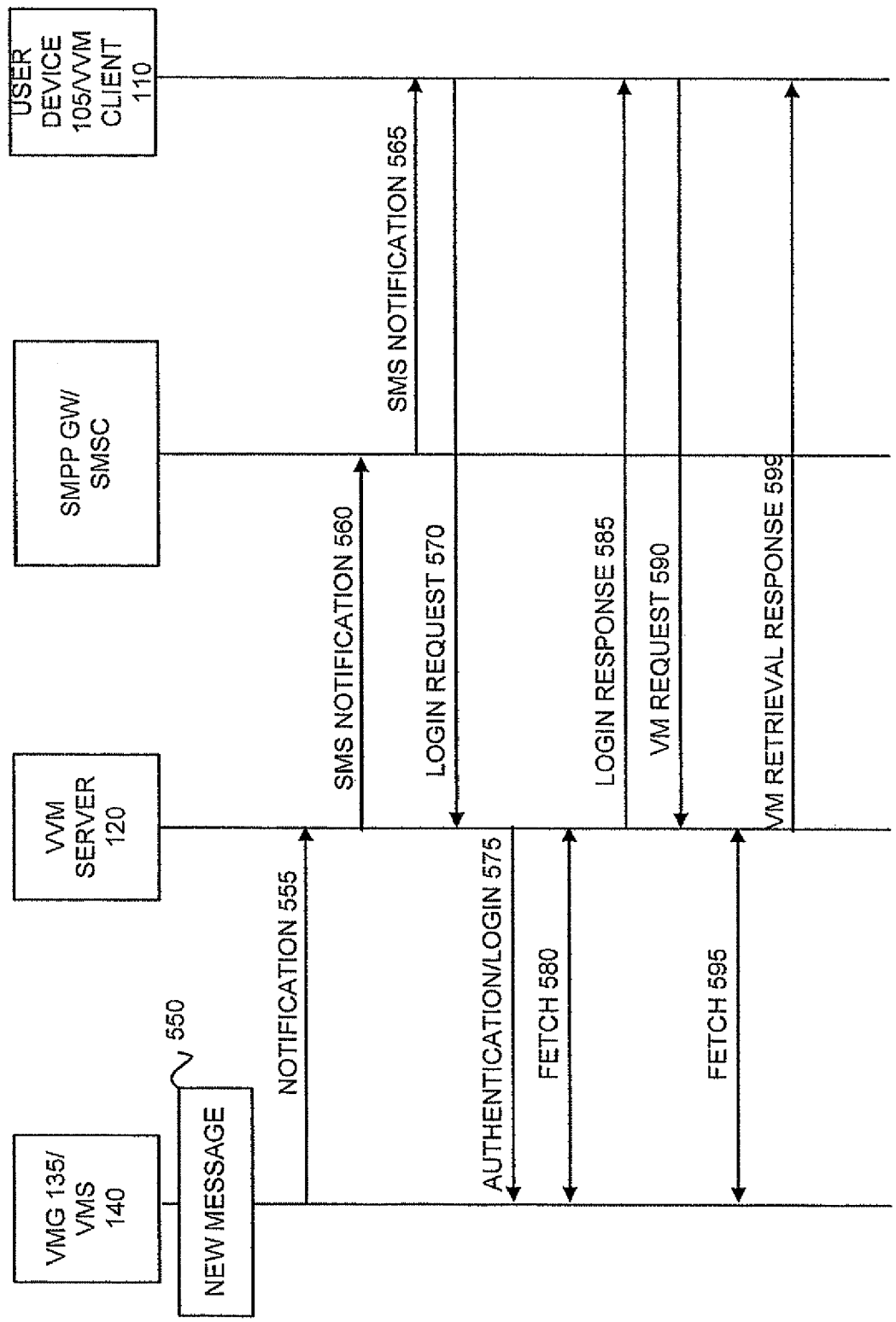
FIG. 5C is a diagram illustrating exemplary messages associated with the notification and retrieval process of FIGS. 5A and 5B.

Described below is an exemplary process for providing notification and retrieval of a new voice mail message. The process will be described as being performed by devices in environment 100. It is assumed that an event (e.g., a new voice message deposit, the subscriber logs out of a voice mail box and hangs up a telephone connection associated with user device 105, etc.) has already occurred which may trigger a notification to user device 105 (e.g., VVM client 110). FIGS. 5A and 5B are flow diagrams illustrating an exemplary process 500 for providing notification and retrieval of new voice mail messages. In addition to FIGS. 5A and 5B, process 500 may be described in reference to the previously described figures. FIG. 5C is a diagram illustrating exemplary messages associated with the notification and retrieval of new voice mail messages of FIGS. 5A and 5B.

Process 500 may begin with the VVM server receiving a notification from the VMS (block 505). For example, as illustrated in FIG. 5C, a new message 550 may be deposited in VMS 140. As a result, VMS 140-1 or VMS 140-2 may transmit a notification 555 to VVM server 120 via VMG 135-1 or VMG 135-2. The notification may include, for example, a destination MDN, a VMS and/or a VMG identifier, etc. In one implementation, the notification may be based on the Short Message Peer-to-Peer (SMPP) protocol. In other implementations, another protocol may be employed.

The VVM server may notify the VVM client (block 510). VVM server 120 may provide notification to VVM client 110. In one implementation, VVM server 120 may interface with a SMPP gateway/Short Message Service Center (SMSC) (not illustrated in FIG. 1) for sending the notification to VVM client 110. For example, VVM server 120 may transmit a SMS notification 560 to SMPP GW/SMSC, and the SMPP GW/SMSC may transmit a SMS notification 565 to VVM client 110, as illustrated in FIG. 4C. The notification may cause VVM client 110 to communicate with the VVM server 120 by sending a login request to the VVM server 120. The notification may also include information (e.g., how many new messages, etc.) obtained from VMS 140-1 or VMS 140-2

The VVM client may transmit a login request to the VVM server (block 515). Based on the notification, VVM client 110 may transmit a login request 570 to VVM server 120. For example, the login request may include a password and VMS 140 and/or VMG 135 location information.

The VVM server may transmit a login command to the VMS (block 520). VVM server 120 may transmit a login command to VMS 140 via VMG 135. In one implementation, VVM server 120 may transmit an IMAP4 AUTHENTICATION/LOGIN command 575, as illustrated in FIG. 5C. In other implementations, other types of protocols may be used, and in turn, other types of login messages may be employed. VMS 140 may validate the authentication information provided by VVM client 110. Assuming that the authentication information is valid, process 500 may continue to block 525.

The VVM server may interact with the VMS to obtain message headers of the voice messages (block 530). VVM server 120 may transmit a fetch command to VMS 140 via VMG 135. In one implementation, VVM server 120 may transmit an IMAP4 FETCH command 580, as illustrated in FIG. 5C. In other implementations, other types of protocols may be used, and in turn, other types of fetch commands may be employed. VMS 140 may provide the headers of the voice messages from the appropriate mail box. VMS 140 may also provide mail box quota information to VVM server 120 via VMG 135. It will be appreciated, in some instances, VVM server 120 may already have authentication information based on a previous login. In such instances, VVM server 120 may retrieve the message headers before sending an SMS notification to VVM client 110. The SMS notification may include, for example, the total number of messages in the voice mail box, the number of unread messages, etc. In this way, VVM client 110 may be allowed to update this information on user device 105 when packet data connectivity is not present.

The VVM server may transmit a login response to the VVM client (block 530). VVM server 120 may transmit a login response 585 to VVM client 110. The login response may include the message headers and other information related to the voice mail (e.g., caller ID information, duration of the new voice message, size of the new voice message, whether the new voice message is private or urgent, etc.).

The VVM client may transmit a request for the new voice message to the VVM server (block 535). As illustrated in FIG. 5C, VVM client 110 may transmit a voice mail (VM) request 590 to VVM server 120. The request may include the VMS and/or VMG location information (e.g., an IP address and an identifier or token (e.g., a domain name)) that indicates the VM box associated with user device 105.

The VMM server requests the new voice message from the VMS (block 540). VVM server 120 may establish a connection with VMS 140 via VMG 135 based on the location information. VVM server 120 may fetch 595 the new voice message from VMS 140 via VMG 135, as illustrated in FIG. 5C.

The VVM server may transmit the new voice message to the VVM client (block 545). VVM server 120 may transmit a VM retrieval response 599 to VVM client 110. The response may include the new voice message.

Although FIGS. 5A and 5B illustrate an exemplary process 500, in other implementations, fewer, additional, or different operations may be performed. Further, it will be appreciated, as previously mentioned in process 400, when VVM server 120 receives a login success (block 430) and forwards it to VVM client 110, VVM client 110 may transmit a request for the new voice message to VVM server 120, as described herein (e.g., in block 535). Process 400 may continue in a manner analogous to that described in blocks 540 and 545. That is, when VVM client 110 receives a successful response to its login request from VVM server 120, VVM client 110 and a VM box may synchronize. Thereafter, based on the successful login, a subscriber in process 400 may utilize VVM services.

Described below is an exemplary process for submission of a VVM message based on VVM client 110. The process will be described as being performed by devices in environment 100.

Figure 6A:
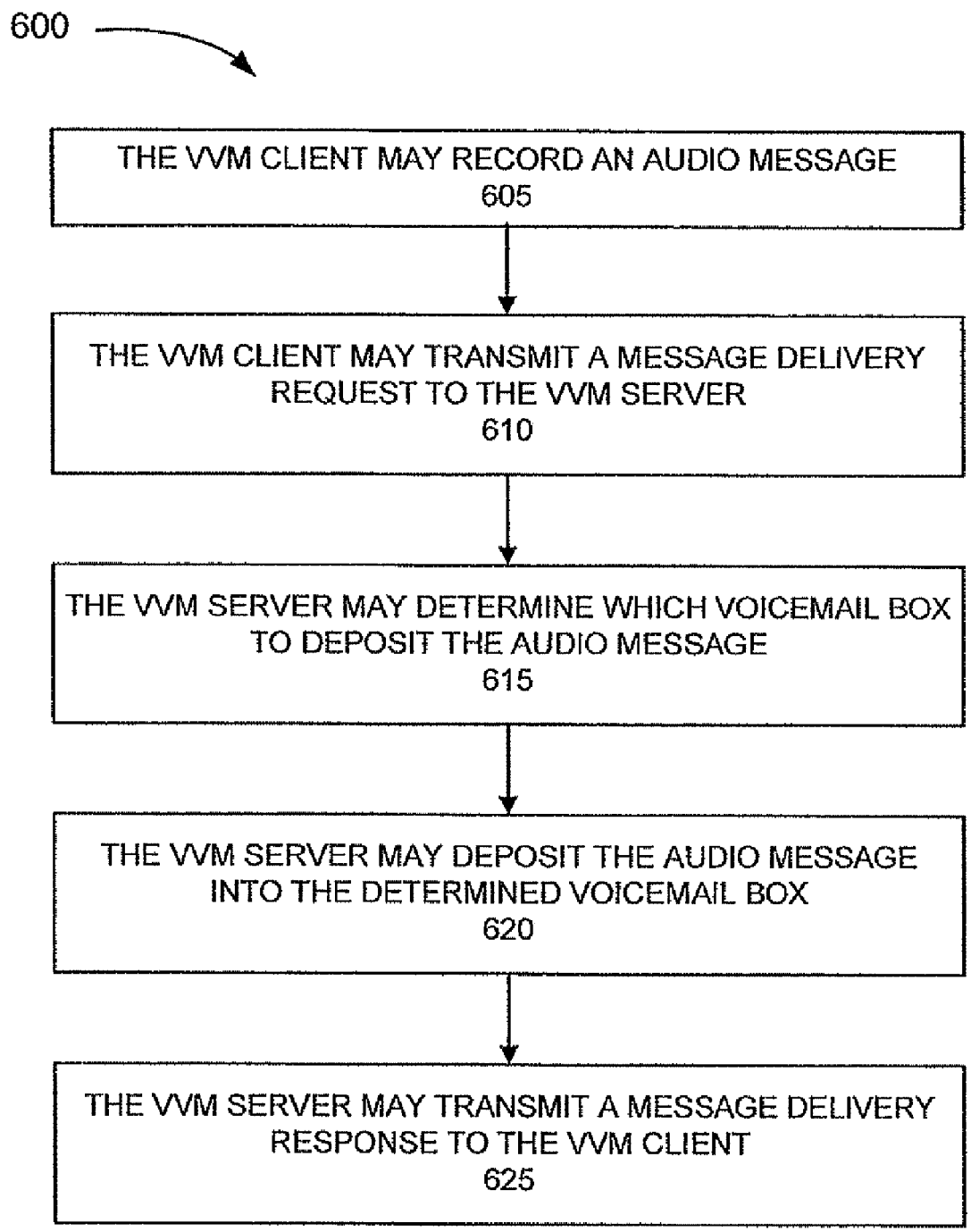
FIG. 6A is a flow diagram illustrating an exemplary process for submitting a voice mail message.
Figure 6B:
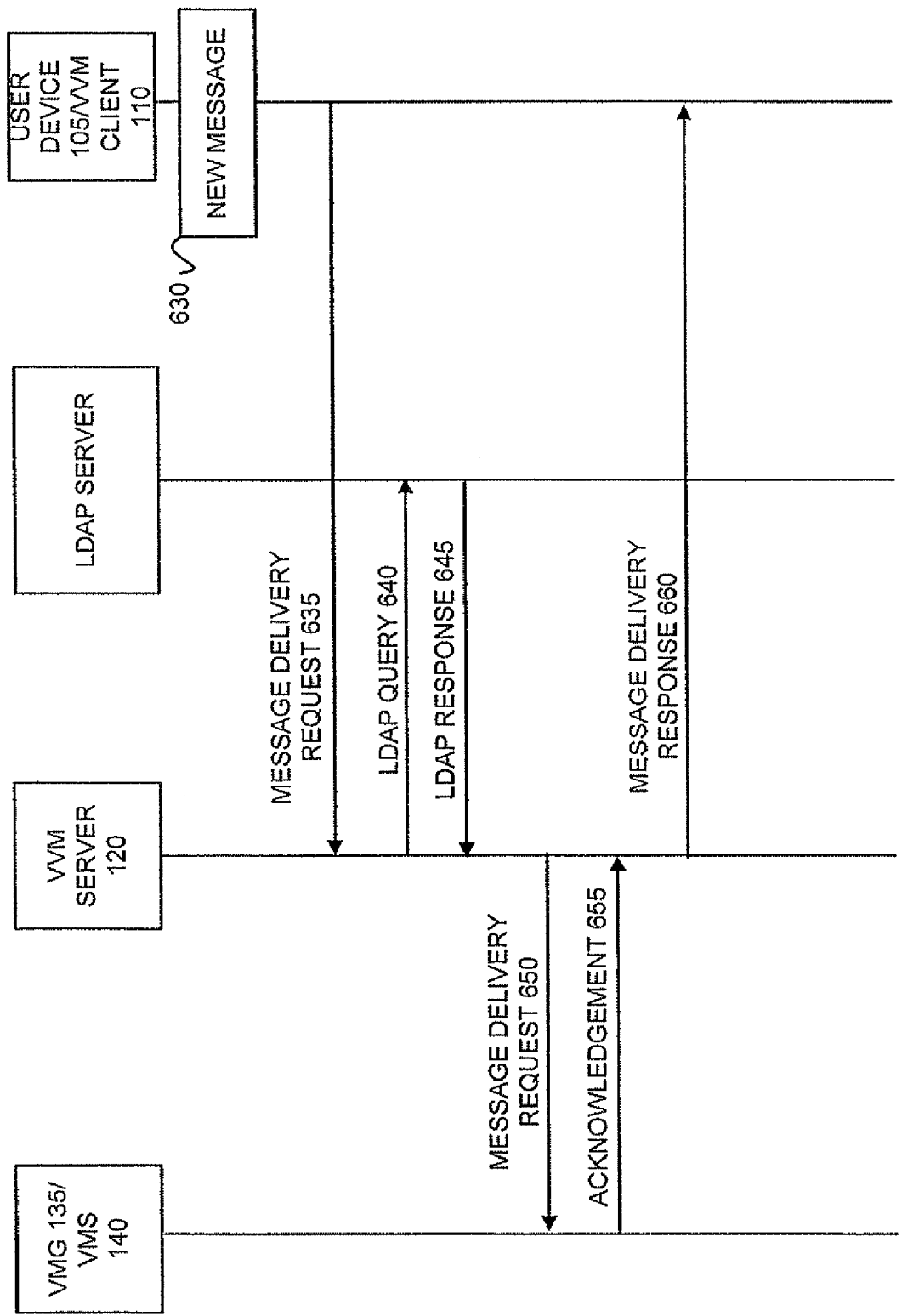
FIG. 6B is a diagram illustrating exemplary messages associated with the submission process of FIG. 6A.

FIG. 6A is a flow diagram illustrating an exemplary process 600 for submission of a voice mail message. In addition to FIG. 6A, process 600 may be described in reference to the previously described figures. As described below, a subscriber may deposit a voice mail message without calling the other party's user device. That is, the subscriber may directly send a voice message to another party's voice mail box. FIG. 6B is a diagram illustrating exemplary messages associated with the submission process of a voice mail message of FIG. 6A. In the description below, it will be appreciated that operations prior to block 605 may be performed. For example, as previously described in blocks 515, 520, 525, and 530, VVM client 110 may transmit a login request, VVM server 120 may transmit a login command and interact with VMS 140, and VVM server 120 may transmit a login response to VVM client 110.

Process 600 may begin with the VVM client recording an audio message (block 605). A subscriber may record an audio message using VVM client 110. For example, the subscriber may speak into microphone 310. The audio message may be stored in storage 220.

The VVM client may transmit a message delivery request to the VVM server (block 610). The message delivery request 635 may include a mobile directory number (MDN) of the party to which the subscriber wishes to deposit the audio message.

The VVM server may determine which voice mail box to deposit (block 615). VVM server 120 may consult a database to determine which of VMGs 135-1 or 135-2 and/or VMSs 140-1 or 140-2 to forward the audio message. In one implementation, VVM server 120 may access a Lightweight Directory Access Protocol (LDAP) server (not illustrated in FIG. 1) to determine the appropriate VMG and/or VMS to forward the audio message. For example, as illustrated in FIG. 6B, VVM server 120 may transmit a LDAP query 640. The database may include an association between destination information (e.g., a MDN) and a VMS and/or a VMG. Based on this association, LDAP server may transmit a LDAP response 645. The LDAP response 645 may include VMS address information.

The VMS server may deposit the audio message into the determined voice mail box (block 620). VVM server 120 may forward the audio message to the corresponding VMG and/or VMS. For example, VVM server may transmit a message delivery request 650 to VMG 135 and/or VMS 140. In one implementation, VVM server 120 may forward the audio message based on Simple Message Transfer Protocol (SMTP). VMG and/or VMS may transmit an acknowledgement 655, as illustrated in FIG. 6B.

The VVM server may transmit a message delivery response to the VVM client (block 625). VVM server 120 may transmit a message delivery response 660 to VVM client 110. Message delivery response 660 may indicate that the audio message was deposited.

Although FIG. 6A illustrates an exemplary process 600, in other implementations, fewer, additional, or different operations may be performed.

According to the concepts described herein, subscribers may self-provision VVM services without interaction with customer support. Additionally, or alternatively, subscribers may receive notifications, and retrieve and submit VM messages in a manner unlike other VM systems.

The foregoing description of implementations provides illustration, but is not intended to be exhaustive or to limit the implementations to the precise form disclosed.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 4A-6, the order of the blocks may be modified in other implementations. Further, non-dependent blocks may be performed in parallel.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   transmitting, by a visual voice mail (VVM) client at a user device that includes voice mail service, a request to access VVM services, where the VVM services are different than the voice mail service;
   receiving, by the VVM client, a negative response if VVM services have not been activated;
   generating, by the VVM client, a prompt for initiating a self-provisioning request to initialize VVM services;
   transmitting, by the VVM client and in response to the prompt, subscription information to a billing server;
   receiving, by the VVM client and in response to transmitting the subscription information, a prompt to restart the VVM client;
   utilizing, by the VVM client and in response to restarting the VVM client, the VVM services.

2. The method of claim 1, where the request includes authentication information, and the negative response is determined by:
   utilizing the authentication information to access a VVM system; and
   receiving, from the VVM system, the negative response based on the authentication information and authorization status.

3. The method of claim 1, further comprising:
   receiving, by the VVM client, a user selection to self-provision VVM services; and
   transmitting, by the VVM client, the self-provisioning request.

4. The method of claim 1, further comprising:
   receiving, from the VVM client, a user selection of VVM services; and configuring the user selection of VVM services on a VVM system.

5. A method comprising:
receiving, by a visual voice mail (VVM) server, a voice mail message with destination information from a VVM client;
determining, by the VVM server, a voice mail (VM) box to deposit the voice mail message based on the destination information, where the determining includes:
    transmitting, by the VVM server, a query message to a server, and
    receiving, by the VVM server and from the server, a response message that includes voice mail system (VMS) address information;
depositing, by the VVM server, the voice mail message in the determined VM box, by transmitting voice mail message delivery request to at least one of the VMS or a voice messaging gateway based on the received VMS address information;
receiving, by the VVM server, an acknowledgment message from the at least one of the VMS or the voice messaging gateway; and
transmitting, by the VVM server, a voice mail message delivery response to the VVM client indicating that the voice mail message was deposited, where the voice mail message is performed without the VVM client placing a call to a user device associated with the VM box.

6. A system comprising:
a visual voice mail (VVM) client, residing on a user device that includes voice mail service, to:
    transmit a request containing authentication information to access VVM services, where the VVM services are different than the voice mail service;
    receive a response to the transmitted request to access VVM services;
    provide a user interface to receive a selection of self-provision VVM services when the response includes an authorization failure;
    transmit subscription information to a self-provisioning system to configure VVM services when the user selection indicates an acceptance to self-provision;
    receive, in response to transmitting the subscription information, a prompt to restart the VVM client; and
    receive, in response to restarting the VVM client, an indication that VVM services have been configured.

7. The system of claim 6, further comprising:
a VVM server to:
    receive the authentication information;
    transmit the authentication information to a VVM system;
    receive a response from the VVM system based on the authentication information and authorization status; and
    provide the response that includes the authorization failure to the VVM client.

8. The system of claim 6, where the self-provisioning system is to configure VVM services on a voice mail (VM) system based on the subscription information.

9. The system of claim 6, where the VVM client is further to:
provide an indication to a user to restart the VVM client.

10. The system of claim 6, where the VVM client is further to:
provide location information of a voice mail box or voice mail system associated with the user device when the VVM client receives notification of a voicemail.

11. The system of claim 6, where the VVM client is further to:
record an audio voice mail message; and
transmit the audio voice mail message and destination information to a VVM server for deposit in a voice mail box.

12. The system of claim 11, where the audio voice mail message is deposited in the voice mail box without calling a user device associated with the voice mail box.

13. The system of claim 6, where the user device includes a wireless telephone.

14. A non-transitory computer-readable medium comprising:
one or more instructions which, when executed by at least one processor, cause the at least one processor to transmit, from a visual voice mail (VVM) client at a user device that includes voice mail service, authentication information for accessing VVM services, where the VVM services are different than the voice mail service;
one or more instructions which, when executed by the at least one processor, cause the at least one processor to receive a negative response if VVM services have not been activated;
one or more instructions which, when executed by the at least one processor, cause the at least one processor to generate a prompt for initiating a self-provisioning request to initialize VVM services;
one or more instructions which, when executed by the at least one processor, cause the at least one processor to receive an input to begin self-provision VVM services;
one or more instructions which, when executed by the at least one processor, cause the at least one processor to transmit, in response to the input, subscription information to a billing server;
one or more instructions which, when executed by the at least one processor, cause the at least one processor to receive, in response to transmitting the subscription information, a prompt to restart the user device;
one or more instructions which, when executed by the at least one processor, cause the at least one processor to restart the VVM client; and
one or more instructions which, when executed by the at least one processor, cause the at least one processor to utilize, in response to restarting the VVM client, the VVM services.

15. The non-transitory computer-readable medium of claim 14, further comprising:
one or more instructions which, when executed by the at least one processor, cause the at least one processor to receive a notification that a new voice mail message is in a voice mail box;
one or more instructions which, when executed by the at least one processor, cause the at least one processor to transmit information that identifies a voice mail system that includes the voice mail box or information that identifies the voice mail box; and
one or more instructions which, when executed by the at least one processor, cause the at least one processor to synchronize with the voice mail box to retrieve the new voice mail message.

16. The non-transitory computer-readable medium of claim 14, further comprising:
one or more instructions which, when executed by the at least one processor, cause the at least one processor to record and store a new voice mail message; and one or more instructions which, when executed by the at least one processor, cause the at least one processor to transmit the new voice mail message to deposit in a voice mail box.

17. The non-transitory computer-readable medium of claim 14, where the voice mail message is deposited in the voice mail box without calling a user device associated with the voice mail box.

18. The method of claim 1, where the user device downloads the VVM client.

19. The system of claim 6, where the user device downloads the VVM client.

20. The non-transitory computer-readable medium of claim 14, where the one or more instructions to transmit authentication information include one or more instructions to transmit a mobile directory number.

* * * * *